United States Patent
Wang

(10) Patent No.: US 9,836,198 B2
(45) Date of Patent: Dec. 5, 2017

(54) SELECTION METHOD FOR SELECTING CONTENT IN FILE

(71) Applicants: Inventec (Pudong) Technology Corporation, Shanghai (CN); INVENTEC CORPORATION, Taipei (TW)

(72) Inventor: Yimin Wang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 260 days.

(21) Appl. No.: 14/936,063

(22) Filed: Nov. 9, 2015

(65) Prior Publication Data

US 2016/0154567 A1    Jun. 2, 2016

(30) Foreign Application Priority Data

Nov. 28, 2014    (CN) .......................... 2014 1 0714208

(51) Int. Cl.
| | | |
|---|---|---|
| G06F 3/048 | (2013.01) | |
| G06F 3/0484 | (2013.01) | |
| G06F 3/0488 | (2013.01) | |
| G06F 3/0482 | (2013.01) | |

(52) U.S. Cl.
CPC ........ *G06F 3/04842* (2013.01); *G06F 3/0482* (2013.01); *G06F 3/0488* (2013.01)

(58) Field of Classification Search
CPC .................................................. G06F 3/04842
See application file for complete search history.

(56) References Cited

U.S. PATENT DOCUMENTS

| | | | |
|---|---|---|---|
| 9,134,890 B2* | 9/2015 | Fujimoto | ............ G06F 3/04842 |
| 9,547,422 B2* | 1/2017 | Bryant | .................. G06F 3/1454 |
| 2014/0160049 A1* | 6/2014 | Shin | ....................... G06F 3/0486 |
| | | | 345/173 |

FOREIGN PATENT DOCUMENTS

| | | |
|---|---|---|
| CN | 103455277 A | 12/2013 |
| TW | 201211839 A | 3/2012 |
| TW | 201227349 A | 7/2012 |
| TW | 201239683 A | 10/2012 |
| TW | 201337597 A | 9/2013 |
| TW | 201346667 A | 11/2013 |
| TW | 201435724 A | 9/2014 |

\* cited by examiner

*Primary Examiner* — William Titcomb

(74) *Attorney, Agent, or Firm* — Muncy, Geissler, Olds & Lowe, P.C.

(57) ABSTRACT

A selection method for selecting content includes the steps of: (a) receiving a first touch point triggered, the first touch point sliding to a second touch point along a first moving track, and recording the first moving track; (b) determining whether the first touching object has left the touch screen; (c) while Step (b) is negative, allowing to receive a third touch point triggered by a second touching object, the third touch point sliding to a fourth touch point along a second moving track, and recording the second moving track; (d) determining whether both the first touching object and the second touching object have left the touch screen; and (e) while Step (d) is positive, basing on the first moving track and the second moving track to simultaneously select and label a first and a second contents of the document corresponding to the first and the second moving tracks, respectively.

10 Claims, 9 Drawing Sheets

SELECTION METHOD FOR SELECTING CONTENT IN FILE

BACKGROUND

1. Technical Field

The description relates to a selection method for selecting content in file, and more particularly to the selection method for selecting simultaneously multiple sections of content of a document displayed on a touch screen.

2. Description of the Prior Art

As the technology progresses, the touch-control electronic device such as the smart phone, the tablet computer and so on has become necessary parts of daily life. Referring to FIG. 1, FIG. 1 shows a current selection of the content of a document. While user will select a content of a document PA2 on the touch screen PA11 of a touch-control electronic device PA1, user's finger is to touch to a first touch point P1 on the touch screen PA11 and move to a second touch point P2 to select a content PA21 of the document PA2.

However, in the case that the user is to require only a first content PA211 and a second content PA212 in the content PA21, he/she needs to select the complete content PA21 and then trim a part of the content PA21 so as to obtain the desired first content PA211 and second content PA212. Obviously, such a conventional select-and-edit movement to obtain different portions from a unique content PA21 is cumbersome, and thus improvement thereupon is definitely welcome to the art.

SUMMARY

According to one aspect of the disclosure, the selection method for selecting content in file is provided for selecting contents of a document displayed on a touch screen of a touch-control electronic device. The selection method includes the steps of: (a) receiving a first touch point triggered by a first touching object on the touch screen, the first touch point sliding to a second touch point along a first moving track, and recording the first moving track; (b) determining whether the first touching object has left the touch screen; (c) while a result of Step (b) is negative, allowing to receive a third touch point triggered by a second touching object on the touch screen, the third touch point sliding to a fourth touch point along a second moving track, and recording the second moving track; (d) determining whether both the first touching object and the second touching object have left the touch screen; and (e) while a result of Step (d) is positive, basing on the first moving track and the second moving track to simultaneously select and label a first content of the document with respect to the first moving track and a second content of the document with respect to the second moving track, so as to edit the first content and the second content.

In one embodiment of the present invention, while the result of Step (d) is negative, a step of determining whether the first touching object or the second touching object has left the touch screen separately is performed. In addition, when one touching object of the first touching object and the second touching object has left the touch screen and another one stays on the touch screen, basing on the moving track generated by the touching object which has left the touch screen to select and label the corresponding content so as to combine with other content will be selected by the touching object staying on the touch screen.

In one embodiment of the present invention, while the result of Step (d) is negative, a step of determining whether the first touching object or the second touching object has left the touch screen separately is performed. Then, as the first touching object or the second touching object hasn't left the touch screen, allow to receive a fifth touch point triggered by a third touching object on the touch screen, and record a third moving track generated by the third touching object from the fifth touch point to a sixth touch point. Also, when the third touching object leaves the touch screen, base on the third moving track to select and label a third content of the document.

More objects are achieved by the selection method for selecting content in file described below.

BRIEF DESCRIPTION OF THE DRAWINGS

The present disclosure will now be specified with reference to its embodiment illustrated in the drawings, in which.

DETAILED DESCRIPTION

It is disclosed a selection method for selecting content in file. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
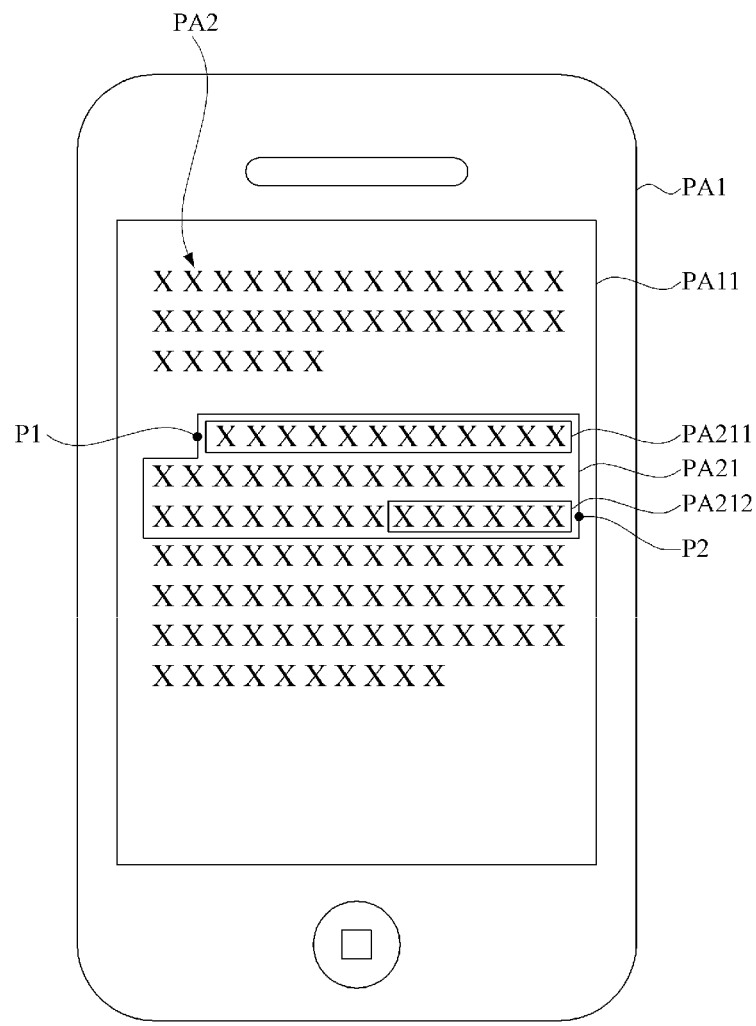
FIG. 1 displays a selection of the content of a document according to a conventional technique.
Figure 2:
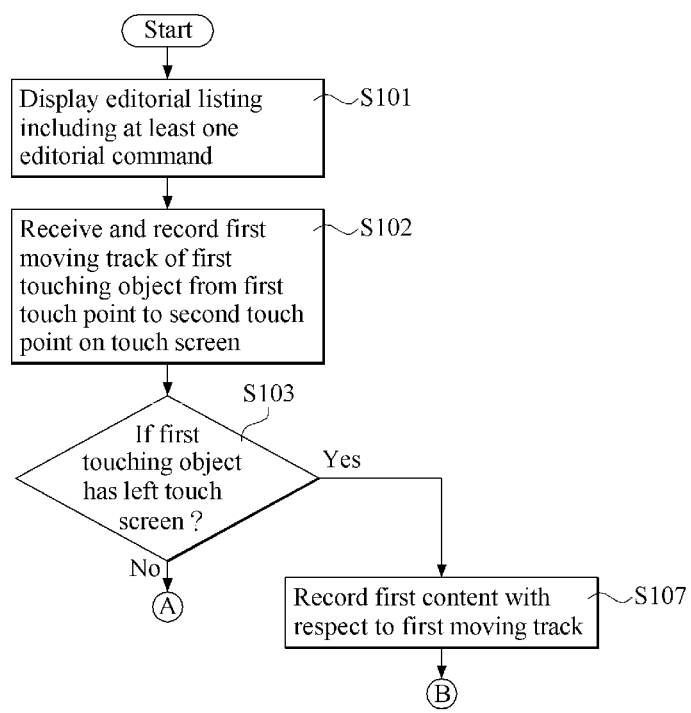
FIG. 2 and FIG. 2A are together to show a flowchart of a first embodiment of the selection method for selecting content in file in accordance with the present invention.
Figure 2A:
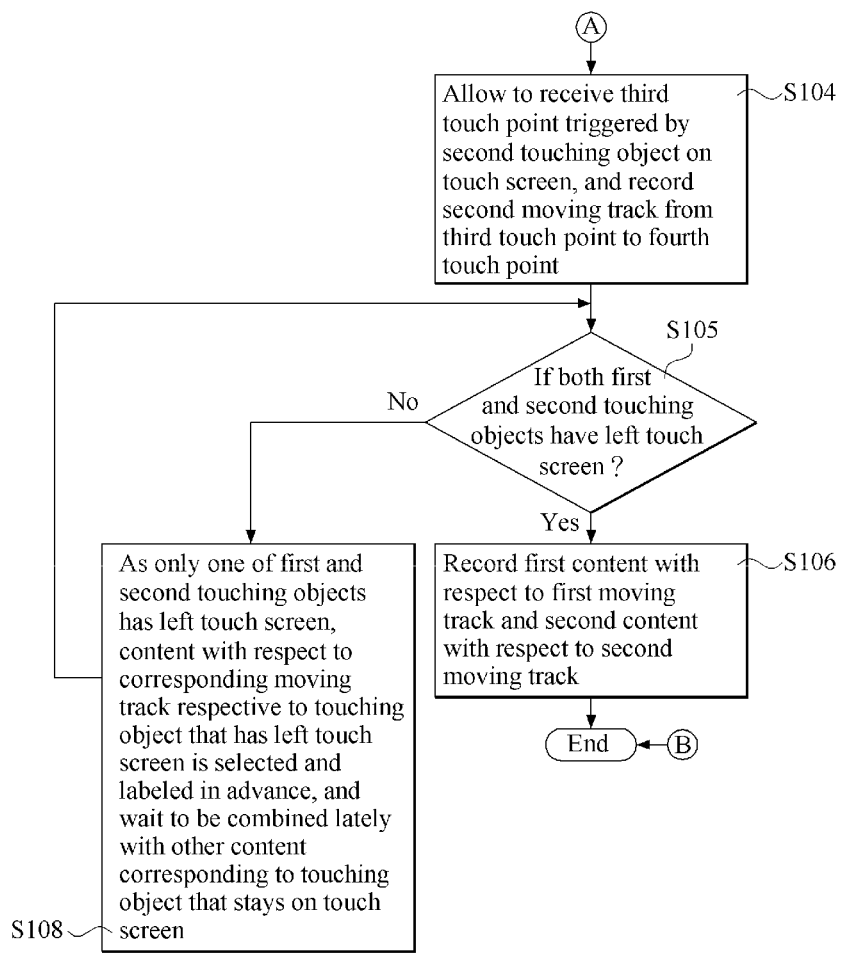
Figure 3:
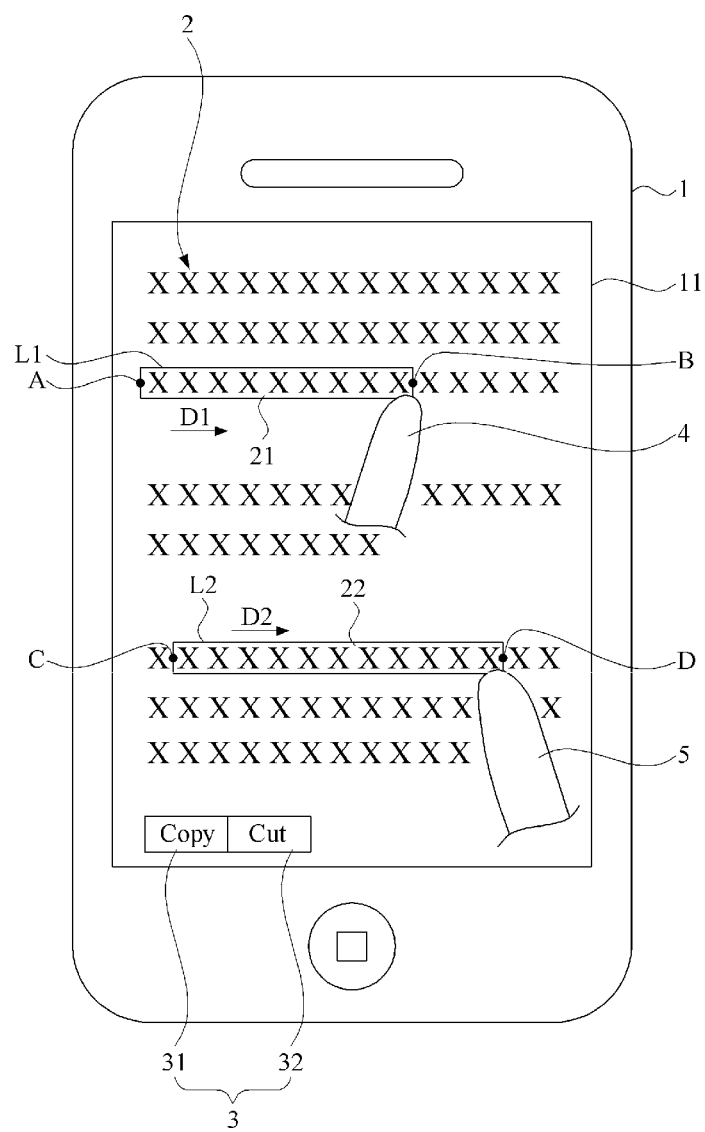
FIG. 3 is a schematic view showing the content selection of the first touching object and the second touching object by the first embodiment of the selection method for selecting content in file in accordance with the present invention.

Refer to FIG. 2 through FIG. 3, FIG. 2 and FIG. 2A show a flowchart of a first embodiment of the selection method for selecting content in file in accordance with the present invention, and FIG. 3 is a schematic view showing the content selection of the first touching object and the second touching object by the first embodiment. The first embodiment of the selection method for selecting content in file is to provide a user to select simultaneously multiple contents of a document 2 on a touch screen 11 of a touch-control electronic device 1. The touch-control electronic device 1 can be a smart phone, a tablet computer or any the like. The document 2 can be a article, a combination file of figures and words, and any kind of documents the like. The selection method for selecting content in file of the present invention can include the following steps.

Step S101: Display an editorial listing including at least one editorial command.

Step S102: Receive a first touch point triggered by a first touching object on the touch screen, slide the first touching object from the first touch point to a second touch point along a first moving track, and then record the first moving track.

Step S103: detect whether the first touching object has left the touch screen.

Step S104: Allow to receive a third touch point triggered by a second touching object on the touch screen, move the second touching object on the touch screen from the third touch point to a fourth touch point along a second moving track, and record the second moving track.

Step S105: Determine whether both the first touching object and the second touching object have left the touch screen?

Step S106: Select and label the first content of the document with respect to the first moving track and the second content of the document with respect to the second moving track.

Step S107: Record the first content with respect to the first moving track.

Step S108: Determine whether the first touching object or the second touching object has left the touch screen separately Step S109: When one of the first and the second touching objects has left the touch screen and another one stays on the touch screen, basing on the moving track generated by the touching object that has left the touch screen to select and label a corresponding content in advance, so that the corresponding content can combine with the other content selected by the touching object staying on the touch screen.

After the beginning of the method (i.e. the "Start" Step), Step S101 is performed to display an editorial listing 3 including at least one editorial command (e.g. 31, 32 shown in the figure) on the touch screen 11 of the touch-control electronic device 1. The editorial command 31 is a "Copy" command, while the editorial command 32 is a "Cut" command. It shall be understood that the editorial command is not limited to the aforesaid "Copy" and "Cut" commands. The editorial listing 3 is provided to the user for selecting the editorial commands 31, 32 by touching. In the first embodiment, the user touches the editorial command to initiate the content-selection function of the touch-control electronic device 1, which is performed by the processing unit of the touch-control electronic device 1 (not shown herein).

Then, Step S102 is performed to receive a first touch point A on the touch screen 11 triggered by the first touching object 4. From the first touch point A, the first touching object 4 slides on the touch screen 11 and along a first moving track L1 to slide to a second touch point B. The processing module of the touch-control electronic device 1 records the aforesaid first moving track L1, and stores it into the memory. In addition, in the first embodiment, the first moving track L1 is the trace extending from the first touch point A to the second touch point B along the first direction D1, in which the first direction D1 is actually a rightward direction. In other embodiments, the related direction can be downward, upward or leftward, and can be detected by a touch sensor of the touch-control electronic device 1. Further, in the present embodiment, the first touching object 4 is a finger of the user. While in other embodiment, the first touching object 4 can be a touch pen, or any object that can perform touching on the touch screen 11.

Then, Step S103 is performed to determine whether or not the first touching object 4 has left the touch screen 11. The processing module of the touch-control electronic device 1 can execute Step S103, and the determining method comprises a step of judging the detection signal from the touch sensor built in the touch screen 11.

While the judgment in Step S103 is negative, then perform Step S104 to allow the touch screen 11 to receive a third touch point C triggered by a second touching object 5. The third touch point C is slid to a fourth touch point D along a second moving track L2, and thereafter the second moving track L2 is recorded. Namely, the processing module of the touch-control electronic device 1 confirms the trigger signal of the second touching object 5. And, the second touching object 5 can be a user's finger other than the one for the first touching object 4. In other embodiments, the second touching object 5 can be a touch pen, or any object that can perform touching on the touch screen 11. In addition, in the first embodiment, the second moving track L2 is the trace extending from the third touch point C to the fourth touch point D along the second direction D2, in which the second direction D2 similar to the first direction D1 is actually a rightward direction. In other embodiments, the related direction can be downward, upward or leftward, and can be detected by a touch sensor of the touch-control electronic device 1. Further, in Step 104, the processing module records the second moving track L2, and stores it in the memory.

While in performing Step S105 to determine whether both the first touching object 4 and the second touching object 5 have left the touch screen 11 (i.e. no more touch on the touch screen 11), the determining method can be the same as that of Step S103, and thus can be omitted herein.

While the determination result in Step S105 is positive, both the first touching object and the second touching object have left the touch screen, Step S106 is performed to base on the first moving track L1 and the second moving track L2 to select and label simultaneously the first content 21 of the document 2 with respect to the first moving track L1 and the second content 22 of the document 2 with respect to the second moving track L2. That is to say, the processing module reads the first moving track L1 and the second moving track L2 from the memory so as to select the first content 21 and the second content 22 from the document 2 for the user to edit the first content 21 and the second content 22; for example, to copy the first content 21 and the second content 22 from the document 2 to the application software of a notebook computer. In addition, it shall be noted that, in the first embodiment, the first content 21 and the second content 22 can be discrete contents, i.e. separated by some wordings. However, in some other embodiments, it might be a figure or video information to separate the first content 21 and the second content 22. Also, either the first content 21 or the second content 22 can be one of a wording, a symbol or a figure.

While the result of Step S103 is positive, then Step S107 is performed to record the first content 21 selected by the user, and to label the first content 21, so that the user can edit the first content 21. The recording and editing herein can be the same as that in Step 6, and thus details can be omitted herein.

While the determination result in Step S105 is negative, it is to determine whether the first touching object 4 and the second touching object 5 leave the touch screen 11 at different times, then perform Step S109. Namely, it is to confirm whether one of the first touching object 4 and the second touching object 5 has left the touch screen 11. If negative (the first touching object 4 and the second touching object 5 are staying on the touch screen 11), then perform continuously the touch-selection of the first content and the second content. If positive, perform Step S108. As any one of the first touching object 4 and the second touching object 5 has left the touch screen 11 and another one touching object stays on the touch screen 11, then basing on the moving track generated by the touching object which has left the touch screen 11 (the leaving touching object) to select and label the respective content of the leaving touching object in advance, and wait for the determination of the content to be selected by the touching object who still stays on the touch screen 11 (the stayed touching object) to determine the content of the touching object. As long as the content with respect to the stayed touching object is determined, the content with respect to the stayed touching object would be integrated and selected together with the content with respect to the leaving touching object. In other words, when the first touching object 4 has left the touch screen 11 and the second touching object 5 keeps staying on the touch screen 11, then the first touching object 4 can repeatedly touch the touch screen 11 so as to generate another moving track. Upon such an arrangement, the processing module keeps recording the respective content for selecting. Repeat Step S105 till it is confirmed that both the first touching object 4 and the second touching object 5 has left the touch screen 11.

Figure 4:
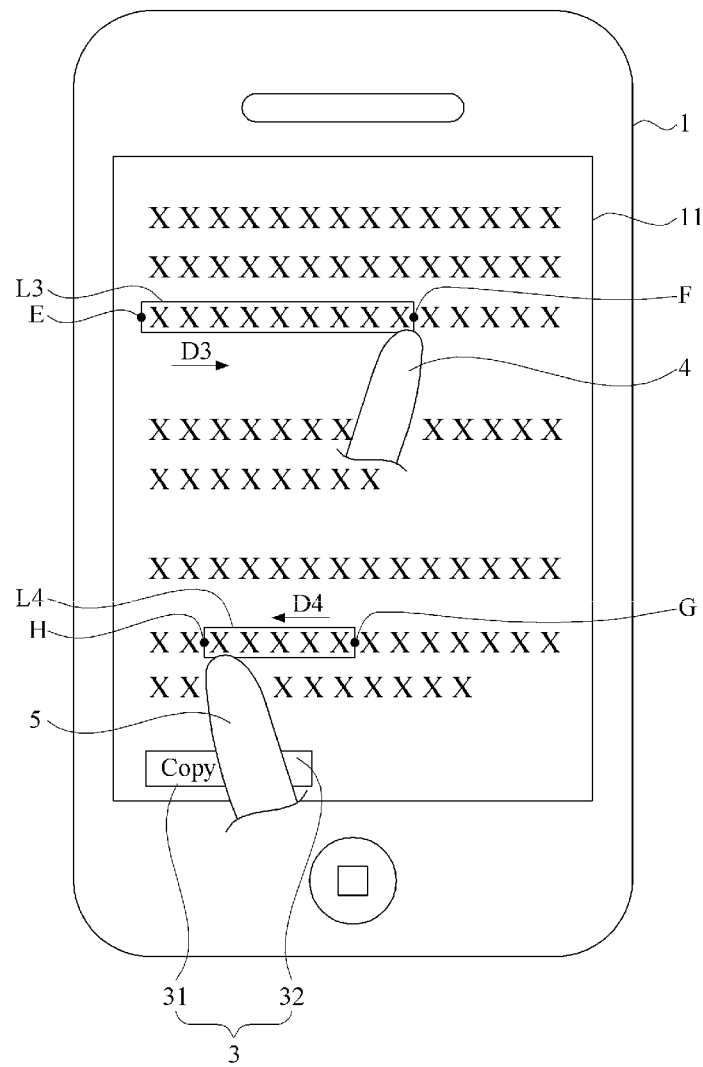
FIG. 4 is a schematic view showing the content selection of the first touching object and the second touching object by another embodiment of the selection method for selecting content in file in accordance with the present invention.

Referring to FIG. 4, a schematic view showing the content selection of the first touching object and the second touching object by another embodiment of the present invention is shown. As shown, the first touching object 4 slides on the touch screen from the first touch point E to the second touch point F along the first moving track L3. The difference to the aforesaid embodiment is that, in this embodiment, the second touching object 5 slides from the third touch point G to the fourth touch point H along the second moving track L4. The first moving track L3 is rightward extended in the first direction D3, while the second moving track L4 is leftward extended in the second direction D4. Namely, the first moving track L3 and the second moving track L4 are extended in reverse directions. Besides the difference in the extending direction, the rest of this embodiment is the same as that in the foregoing first embodiment, and thus details thereabout would be omitted herein.

Figure 5:
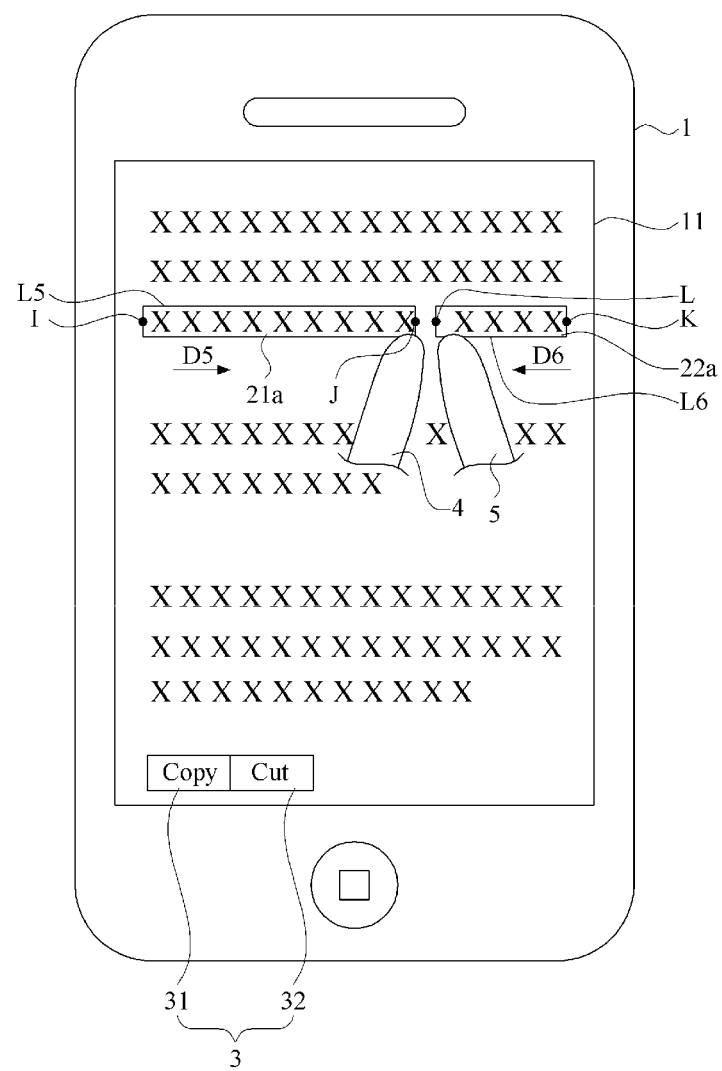
FIG. 5 is a schematic view showing the content selection of the first touching object and the second touching object by a further embodiment of the selection method for selecting content in file in accordance with the present invention.

Referring now to FIG. 5, a schematic view showing the content selection of the first touching object and the second touching object by a further embodiment of the selection method for selecting content in file in accordance with the present invention is shown. In this embodiment, the first touching object 4 similarly slides from the first touch point 1 to the second touch point J along the first moving track L5, while the second touching object 5 slides from the third touch point K to the fourth touch point L along the second moving track L6. Particularly, the first moving track L5 is rightward extended in the first direction D5, and the second moving track L6 is extended in the second direction D6. In particular of FIG. 5 the first moving track L5 and the second moving track L6 are extended in opposing directions, and the first content 21a respective to the first moving track L5 is overlapped to the second content 22a respective to the second moving track L6. Then the processing module records the first content 21a and the second content 22a and combines the first content 21a and the second content 22a into a whole content (not labeled in the figure). Besides the aforesaid difference, the rest of this embodiment is the same as that in the foregoing first embodiment, and thus details thereabout would be omitted herein.

Figure 6:
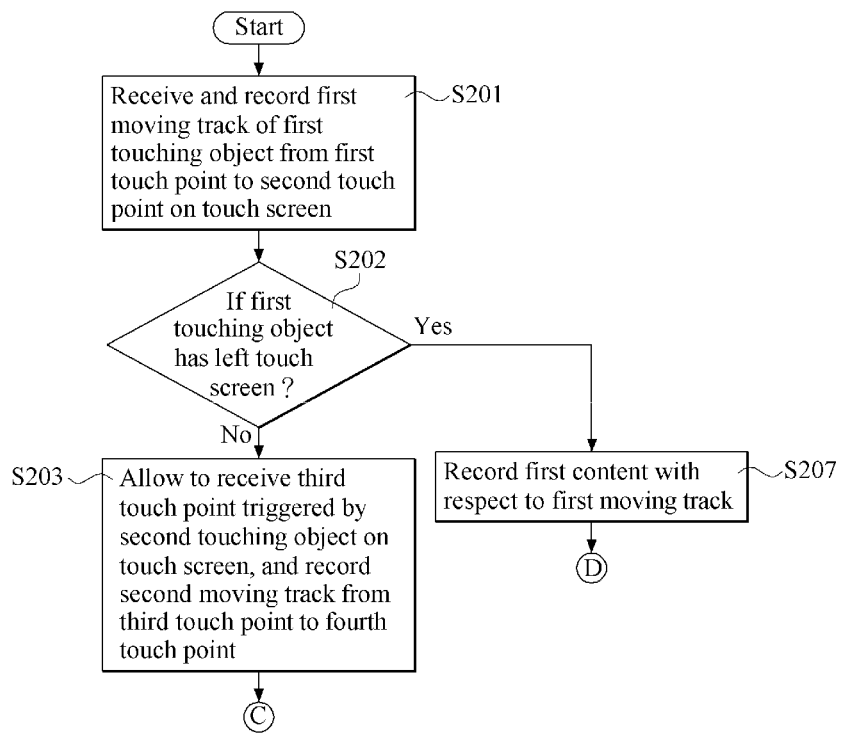
FIG. 6 and FIG. 6A are together to show a flowchart of a second embodiment of the selection method for selecting content in file in accordance with the present invention.
Figure 6A:
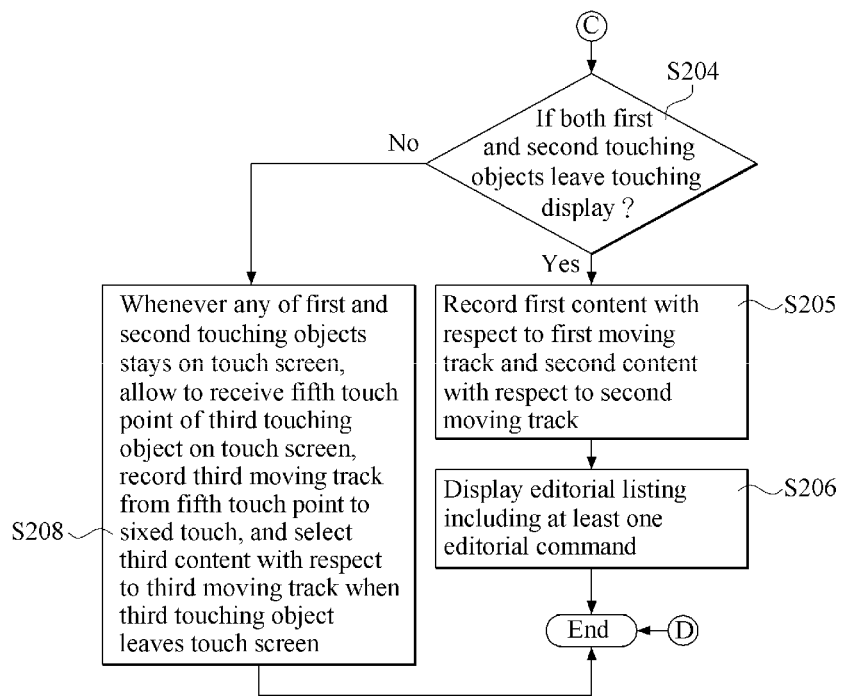
Figure 7:
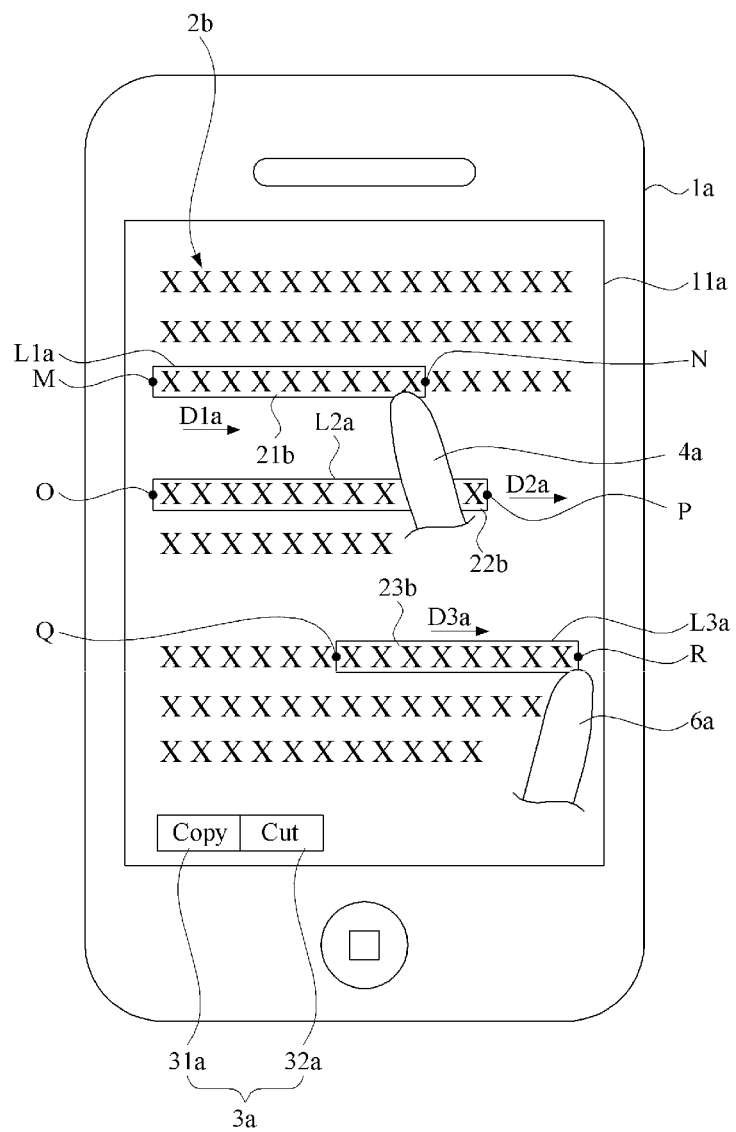
FIG. 7 is a schematic view showing the content selection of the first touching object and the second touching object by the second embodiment of the selection method for selecting content in file in accordance with the present invention.

Refer to FIG. 6 through FIG. 7, FIG. 6 and FIG. 6A show a flowchart of a second embodiment of the selection method for selecting content in file in accordance with the present invention, and FIG. 7 is a schematic view showing the content selection of the first touching object and the second touching object by the second embodiment. As shown, the second embodiment of the selection method for selecting content in file can include the following steps.

By referring to Step S109 of the aforesaid first embodiment, when one of the first and the second touching objects has left the touch screen and another one stays on the touch screen, base on the moving track generated by the touching object that has left the touch screen to select and label a corresponding content in advance, so that the corresponding content can combine with the other content selected by the touching object staying on the touch screen. In this second embodiment, multiple selections can be also performed as follows.

Step S201: Receive a first touch point M triggered by a first touching object 4a on the touch screen 11a, then slide the first touch point M to a second touch point N along a first moving track L1a, and then record first moving track L1a.

Step S202: Detect whether the first touching object 4a has left the touch screen 11a.

Step S203: Allow to receive a third touch point O (not labeled in the figure) triggered by a second touching object on the touch screen 11a, extend the third touch point O to a fourth touch point P by sliding along a second moving track L2a, and then record the second moving track L2a.

Step S204: Determine whether both the first touching object 4a and the second touching object have left the touch screen 11a.

Step S205: Base on the first moving track L1a and the second moving track L2a to select simultaneously a first content 21b of a document 2b with respect to the first moving track L1a and a second content 22b of a document 2b with respect to the second moving track L2a.

Step S206: Display an editorial listing 3a including at least one editorial command (two 31a, 32a shown in the figure).

Step S207: Record the first content 21b selected by the user.

Step S208: Whenever any of the first touching object 4a and the second touching object doesn't leave the touch screen 11a, allow to receive a fifth touch point Q triggered by a third touching object 6a on the touch screen 11a, and record a third moving track L3a generated by sliding the fifth touch point Q to a sixth touch point R. As the third touching object 6a leaves the touch screen 11a, base on the third moving track L3a to select and label a third content 23b of the document 2b with respect to the third moving track L3a.

One difference between the first and the second embodiments is to move Step S101 of the first embodiment to Step S206 of the second embodiment, so that, in Step S206 of the second embodiment, a user can perform editing upon the first content 21b and the second content 22b.

In addition, when the judgment result of Step S204 is negative, it shall be determined in advance whether or not the first touching object 4a and the second touching object (not labeled in the figure) have left the touch screen 11a of the touch-control electronic device 1a separately. Namely, it shall be confirmed in advance whether any of the first touching object 4a and the second touching object has left the touch screen 11a. Whenever the confirmed result is negative, then no other further action is added. On the other hand, whenever the confirmed result is positive, then perform Step S208. In Step S208, as the second touching object has already left the touch screen 11a and the first touching object 4a is yet to leave the touch screen 11a, base on the second moving track to select and label the second content 22ba of the document with respect to the second moving track L2a, and allow to receive a fifth touch point Q triggered by the third touching object 6a on the touch screen 11a. Then, record the third moving track L3a generated by sliding the fifth touch point Q to the sixth touch point R, and select and label a third content 23b of the document with respect to the third moving track L3a. The third moving track L3a, the first moving track L1a and the second moving track L2a are extended in the same direction. Namely, the third direction D3a, the first direction D1a and the second direction D2a are the same direction. Though, in this embodiment, the first direction D1a, the second direction D2a and the third direction D3a are the same direction, but practically the first direction D1a, the second direction D2a and the third direction D3a can be different directions. As the first touching object 4a and the third touching object 6a both have left the touch screen 11a, then base on the first moving track L1a to select and label a first content 21b of a document 2b with respect to the first moving track L1a, and also base on the third moving track L3a to select and label a third content 23b of the document 2b with respect to the third moving track L3a, such that the first content 21b, the third content 23b and the second content 22ba can be selected simultaneously. Therefore, the user can edit the first content 21b, the second content 22b and the third content 23b conveniently. In addition, the third touching object 6a can be a finger of the user, the touch pen or any the like. As the first touching object 4a, the second touching object and the third touching object 6a are all fingers, they actually can be assigned arbitrarily to different fingers of both hands. For example, the first touching object 4a can be the index finger of user's left hand, while the second touching object and third touching object 6a can be the index finger of user's right hand.

In summary, by providing the selection method for selecting content in file in accordance with the present invention, the user can skip the figures or specific sentences to select multiple content in a file simultaneously, such that no more multiple operations in content-selection and editing is required.

While the present invention has been particularly shown and described with reference to a preferred embodiment, it will be understood by those skilled in the art that various changes in form and detail may be without departing from the spirit and scope of the present invention.

What is claimed is:

1. A selection method for selecting content in file, for selecting at least one content of a document displayed on a touch screen of a touch-control electronic device, comprising the steps of:
 (a) receiving a first touch point triggered by a first touching object on the touch screen, the first touch point sliding to a second touch point along a first moving track, and recording the first moving track;
 (b) detecting whether the first touching object has left the touch screen;
 (c) while a result of Step (b) is negative, allowing to receive a third touch point triggered by a second touching object on the touch screen, the third touch point sliding to a fourth touch point along a second moving track, and recording the second moving track;
 (d) determining whether both the first touching object and the second touching object have left the touch screen; and
 (e) while a result of Step (d) is positive, basing on the first moving track and the second moving track to simultaneously select and label a first content of the document with respect to the first moving track and a second content of the document with respect to the second moving track, so as to edit the first content and the second content.

2. The selection method for selecting content in file of claim 1, wherein, while the result of Step (d) is negative, a step of determining whether the first touching object or the second touching object has left the touch screen separately is performed; wherein, when one touching object of the first touching object and the second touching object has left the touch screen and another one stays on the touch screen, basing on the moving track generated by the touching object that has left the touch screen to select and label a corresponding content in advance.

3. The selection method for selecting content in file of claim 1, wherein, while the result of Step (d) is negative, a step of determining whether the first touching object or the second touching object has left the touch screen separately is performed; wherein, when the first touching object or the second touching object has not leave the touch screen, allowing to receive a fifth touch point triggered by a third touching object on the touch screen, and recording a third moving track generated by the third touching object sliding from the fifth touch point to a sixth touch point; when the third touching object leaves the touch screen, basing on the third moving track to select and label a third content of the document.

4. The selection method for selecting content in file of claim 1, wherein, prior to Step (a), a Step (a0) is included to display an editorial listing including at least one editorial command.

5. The selection method for selecting content in file of claim 1, wherein, posterior to Step (e), a Step (e0) is included to display an editorial listing including at least one editorial command for the user selecting the editorial command to edit the first content and the second content.

6. The selection method for selecting content in file of claim 1, wherein, in Step (e), integrating the first content and the second content into a whole content, when the first content and the first content are overlapping.

7. The selection method for selecting content in file of claim 1, wherein the first content and the second content are separate.

8. The selection method for selecting content in file of claim 1, wherein directions of the first moving track and the second moving track are the same or opposite.

9. The selection method for selecting content in file of claim 1, wherein the first content and the second content are characters, symbols and any combination of the characters and the symbols.

10. The selection method for selecting content in file of claim 1, wherein, while a result of Step (b) is positive, a Step (f) is performed to select the first content with respect to the first moving track for editing.

* * * * *